April 11, 1950 — A. COUTANT ET AL — 2,503,325
KINEMATOGRAPHIC CAMERA VIEW FINDER
Filed Sept. 19, 1945 — 3 Sheets-Sheet 1

April 11, 1950  A. COUTANT ET AL  2,503,325
KINEMATOGRAPHIC CAMERA VIEW FINDER
Filed Sept. 19, 1945  3 Sheets-Sheet 2

Patented Apr. 11, 1950

2,503,325

UNITED STATES PATENT OFFICE 2,503,325

KINEMATOGRAPHIC CAMERA VIEW FINDER

André Coutant and Jacques Mathot,
Paris, France

Application September 19, 1945, Serial No. 617,427
In France December 23, 1944

4 Claims. (Cl. 88—16)

This invention relates to improvements in kinematographic camera view-finders, for the purpose of providing as much as possible a perfect light-tightness as the film is moved between two successive exposures and the longest possible time of exposure as the film remains still for the taking of a photograph, while giving a scintillationless vision of the kinematographed scenes, by means of a sturdy apparatus which can be manufactured easily at low cost and which is consistent with the use of short- and very short-focus lenses.

For that purpose, the view-finder according to this invention is characterised notably by the combination of an obturator adapted to rotate about an axis set at an angle of 45° to the optical axis of the lens, consisting in one solid sector having a suitable central angle, or of several similar solid sectors uniformly distributed about their axis of rotation, imparted with a definite uniform rotational speed about the axis of rotation, with a reflector adapted to rotate about the same axis, consisting of twice as many solid reflecting sectors as sectors are present in the obturator, said reflecting sectors being uniformly distributed about their axis, their central angle being at the most equal to half that of the obturator sectors, a uniform rotational movement being imparted thereto about their common axis with half the speed of the obturator.

In a preferred embodiment of this invention the view-finder comprises an obturator consisting of a sector of a frustum of a cone of revolution whose axis is set at 45° to the optical axis of the lens and which is rotated by one complete revolution while the film is moved on by one image, that is, with usual cameras, 1440 revolutions per minute, and of a plane reflector composed of a pair of symmetric sectors whose center angles are at the most half that of the obturator sector, set at right angles to their axis of rotation which is the same as the obturator axis and about which it revolves at half the speed of the obturator, that is 720 revolutions per minute.

Preferably, the axis of rotation common to the obturator and the reflector lies in a plane through the optical axis of the lens and the axis of travel of the film through the channel, i. e., generally, in the vertical plane through the optical axis of the lens; since the images are less high than wide, a smaller reflector can be used, which on one hand makes for an easier manufacture and on the other hand allows to locate the lens nearer to the film and consequently to use shorter focus lenses.

Moreover and also for the same purpose, the obturator and reflector according to this invention are very decidedly curved in the shape of a dish, which is made easier by the fact that on account of their particular design they can be made entirely of metal.

An embodiment of this invention is shown as an indicative and by no means limitary example in the appended drawing.

Figure 1:
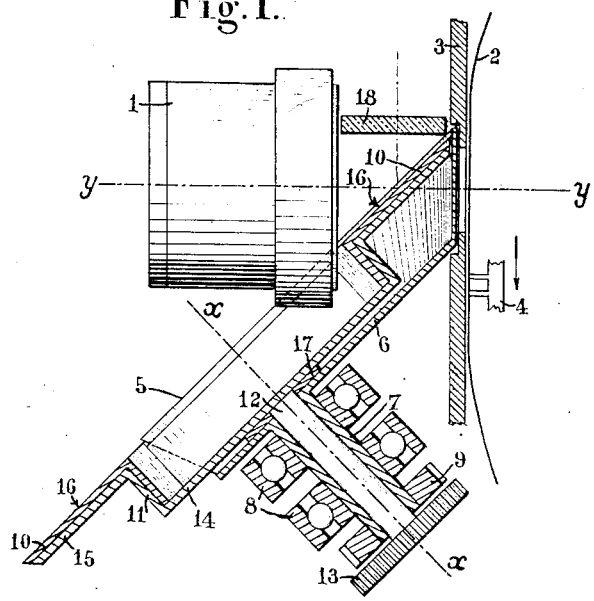
Figure 1 is a longitudinal sectional view in a plane through the optical axis of the camera.
Figure 2:
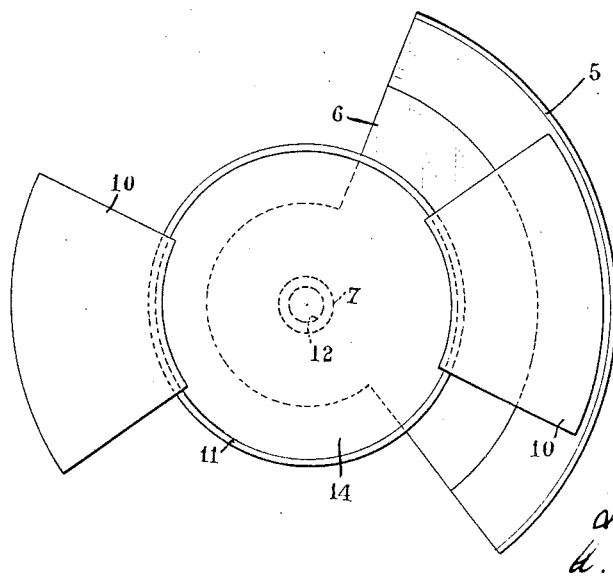
Figure 2 is a front view of the reflector and the obturator apart from the other elements of the camera.

The camera comprises a lens 1 behind which the film 2 is travelled through the channel 3 by the alternating action of the film travelling sprockets 4.

The obturator consists in a sector 5 of a frustum of a cone of revolution about the axis $x$—$x$ which is set at an angle of 45° to the optical axis $y$—$y$ of the lens 1; said frusto-conical sector 5 is connected by a plane sector 6, at right angles to the axis $x$—$x$, with the hollow shaft 7 carried by ball bearings 8 and rotated at the rate of 1440 revolutions per minute through the medium of pinion 9.

The reflector consists of a pair of symmetric plane sectors 10 whose central angle is at the most half that of the frusto-conical sector 5, set at right angles to their axis of symmetry $x$—$x$, arranged at the periphery of a drum 11 secured to the end of a shaft 12 revolubly mounted in the hollow shaft 7 and driven at the rate of 720 rev. per minute through the medium of a pinion 13.

Preferably, the plane sectors 10 of the reflector are made of two parts, viz.: a steel support 15 rigid with the drum 11 and carrying the reflecting surface 16 of stainless metal or any other suitable material.

An antifriction washer 17 can be interposed between the plane sector 6 of the obturator and the bottom 14 of the drum 11.

Of course, all these parts are machined and ground with utmost care in order to avoid every scintillation of the scenes kinematographed, which is connected with no peculiar difficulties.

This view-finder is complemented by a ground glass 18 on which the reversed images of the scenes photographed on the film 2 are formed, and contingently by an additional reflecting mirror set at an angle of 45° to the optical axis of the lens and by suitable lenses.

In this construction, in contradistinction to those already performed, the reflecting disc does not provide an obturator; it is revolved at half the speed of the mechanism for the stepwise travelling of the film with a view to avoid vibrations due to its comparatively considerable mass, while a great accuracy is necessary in its rotation, no more than 1/100 mm. warp being allowed.

The obturator is made of thin sheet metal and is revolved at the film travelling speed, i. e., twice the speed of rotation of the reflecting disc; the obturator thus operates with a higher angular obturating speed than if the reflecting disc were to act as the obturator; consequently, the gate for the exposure of the film is cleared very quickly as soon as the action of the sprocket motion is completed; the film is thus exposed sooner to the light, which materially increases the duration of the exposure; moreover, the obturator operates very close to the film, which avoids light diffusion by the ground glass by the time the latter is illuminated by the reflecting disc.

It is to be understood that the embodiment of this invention as described hereinbefore with reference to the appended drawing is given merely by way of example and that many modifications can be made without thereby departing from the scope of the invention.

Thus, for instance, instead of providing the reflecting surface as a stainless metal plate 16 secured on a steel support 15, it can be made of moulded or cast metal or glass.

Figure 3:
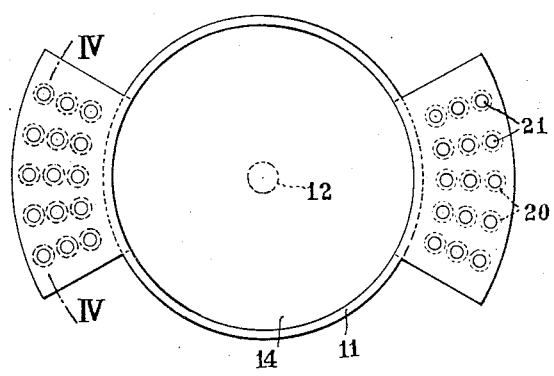
Figures 3 to 6 show modifications of the reflector.
Figure 4:
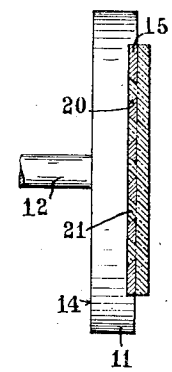

A reflector the reflecting surface of which is made of cast aluminum is shown in Figs. 3 and 4 respectively in plan view and in vertical sectional view taken on line IV—IV in Fig. 3; for that purpose, the steel support 15 is drilled with holes 20 into which the aluminum flows which is cast in a plane and thin layer 21 said holes providing a dovetail anchoring.

Figure 5:
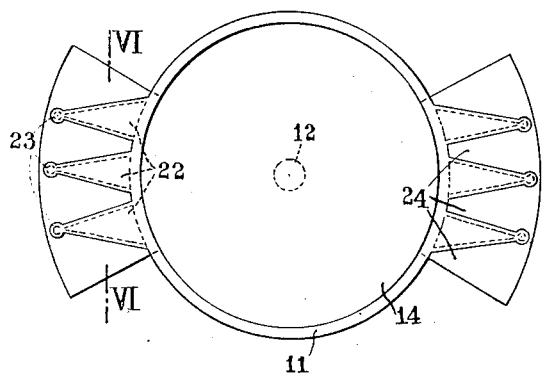
Figure 6:
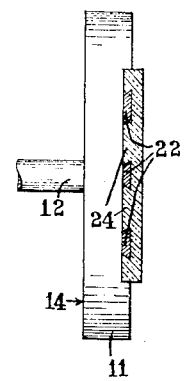

In the embodiment shown in Figs. 5 and 6 the steel support consists of three lugs 22 with rounded ends 23; said lugs are wider at their top than at their bottom faces, to provide for a better hold of the glass moulded thereon at 24.

Figure 8:
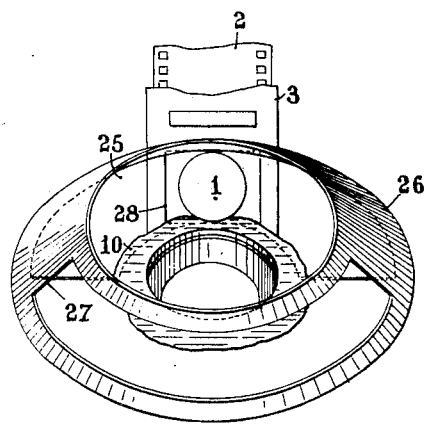

It is to be noted that in Figs. 3 and 5 the reflecting surfaces 21 and 24 are assumed to be transparent, for the purpose of better showing the anchoring arrangement, and that in Fig. 8 the reflector 10 is assumed to be partly broken away.

Of course, other embodiments are possible.

Although two embodiments of the reflector have been shown by way of example, it is to be understood that a great many more could be contemplated without departing from the scope of this invention.

On the other hand, instead of rotating the reflector at half the speed of the obturator, it is also possible in some instances to cause same to revolve at the same speed; the reflector then has as many sectors as the obturator, said sectors being arranged on the same axes and their central angles being slightly smaller. With such an arrangement, of course, the advantage of a slower rotation of the reflector is lost; nevertheless, part of the aforesaid advantages are retained, notably the light-tightening qualities.

Figure 7:
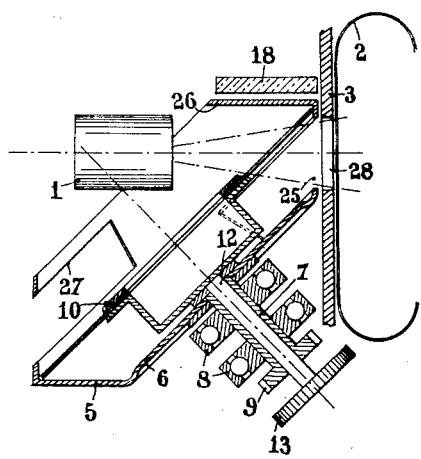
Figures 7 and 8 show a modification of the obturator.

In the latter respect, the effects of light-diffusion through the ground glass during the periods of exposure of film 2 could be apprehended; in order to avoid the said inconvenience, according to a peculiarity of this invention, such an arrangement can be adopted as shown in Figs. 7 and 8.

The frusto-conical obturator 5 comprises a gate 25 which is located in front of the film 2 while the film is being exposed, whereas the solid sector of the obturator is located in front of the film while the film is being travelled; said frusto-conical obturator is complemented by a mask designed as a frusto-conical sector 26 having the same axis as the former and arranged at right angles thereto; said frusto-conical mask is formed with an aperture 27 diametrically opposed to the aperture 25 and which is positioned in front of the ground glass 18 during the periods of travelling of the film, when the gate 28 is shut off by the obturator 5; in this manner, no light diffusion by the ground glass can deteriorate the photographic quality of the exposed film 2.

It is to be understood that said mask can be used advantageously in connection with all those reflector and obturator view-finders whose axis is set at an angle of 45°.

What we claim as our invention and desire to secure by Letters Patent is:

1. A view-finder for kinematographic cameras, comprising an obturator rotatable about an axis to be set at an angle of 45° to the optical axis of the camera lens, said obturator comprising at least one solid sector, means to impart said obturator with a uniform movement about its axis of rotation, a reflector rotatable about the same axis and comprising twice as many solid reflecting sectors as sectors are present in the obturator, said reflecting sectors being uniformly distributed about their axis, their central angle being at the most equal to half that of the obturator sectors, and means to impart said reflector with half the speed of and in the same direction as the obturator about their common axis.

2. A view-finder for kinematographic cameras, comprising an obturator rotatable about an axis to be set at an angle of 45° to the optical axis of the camera lens, said obturator comprising a plurality of similar solid sectors uniformly distributed about their axis of rotation, means to impart said obturator with a uniform movement about its axis of rotation, a reflector rotatable about the same axis and comprising twice as many solid reflecting sectors as sectors are present in the obturator, said reflecting sectors being uniformly distributed about their axis, their central angle being at the most equal to half that of the obturator sectors, and means to impart said reflector with half the speed of and in the same direction as the obturator about their common axis.

3. A view-finder for kinematographic cameras, comprising an obturator consisting in a sector of a frustum of a cone of revolution rotatable about its own axis and having an aperture of 45°, means to rotate said obturator by one complete revolution each time the film is moved on by one picture in the camera, and a plane reflector rotatable about the same axis, consisting of a pair of sectors at right angles to said axis of rotation, and means to rotate said reflector in the same direction about its axis by one complete revolution each time the film is moved on by two images in the camera.

4. A view-finder as claimed in claim 1, comprising an obturator and a reflector which are curved in the shape of a deep dish.

ANDRÉ COUTANT.
JACQUES MATHOT.

REFERENCES CITED

The following references are of record in the file of this patent:

UNITED STATES PATENTS

| Number | Name | Date |
|---|---|---|
| 1,012,344 | England | Dec. 19, 1911 |
| 1,275,249 | Hlavaty | Aug. 13, 1918 |
| 1,340,557 | Pennypacker | Mar. 18, 1920 |
| 1,353,191 | Thomas | Sept. 21, 1920 |
| 1,388,423 | Gauriat | Aug. 23, 1921 |
| 2,009,053 | Mayer | July 23, 1935 |
| 2,029,418 | Friedland | Feb. 4, 1936 |
| 2,305,201 | Sloan | Dec. 15, 1942 |

FOREIGN PATENTS

| Number | Country | Date |
|---|---|---|
| 275,404 | Germany | June 17, 1914 |
| 442,071 | Germany | June 24, 1927 |
| 218,900 | Switzerland | Apr. 16, 1942 |